US009409149B2

(12) United States Patent
Koranne et al.

(10) Patent No.: US 9,409,149 B2
(45) Date of Patent: Aug. 9, 2016

(54) SULFUR RESISTANT CLADDED TITANIA—ALUMINA SUPPORTS

(75) Inventors: Manoj Mukund Koranne, Clarksville, MD (US); David Chapamn, Ellicott City, MD (US)

(73) Assignee: W. R. GRACE & CO.-CONN., Columbia, MD (US)

( * ) Notice: Subject to any disclaimer, the term of this patent is extended or adjusted under 35 U.S.C. 154(b) by 1063 days.

(21) Appl. No.: 13/498,609

(22) PCT Filed: Oct. 1, 2010

(86) PCT No.: PCT/US2010/051072
§ 371 (c)(1),
(2), (4) Date: Mar. 28, 2012

(87) PCT Pub. No.: WO2011/043995
PCT Pub. Date: Apr. 14, 2011

(65) Prior Publication Data
US 2012/0190541 A1 Jul. 26, 2012

Related U.S. Application Data

(60) Provisional application No. 61/249,824, filed on Oct. 8, 2009.

(51) Int. Cl.
| *B01J 21/04* | (2006.01) |
| *B01J 21/06* | (2006.01) |
| *B01J 23/10* | (2006.01) |
| *B01J 23/40* | (2006.01) |
| *B01J 35/00* | (2006.01) |
| *B01J 35/02* | (2006.01) |
| *B01J 35/10* | (2006.01) |
| *B01J 37/00* | (2006.01) |
| *B01J 37/02* | (2006.01) |
| *B01J 37/03* | (2006.01) |
| *C01F 7/02* | (2006.01) |
| *B01D 53/94* | (2006.01) |

(52) U.S. Cl.
CPC ............... *B01J 21/063* (2013.01); *B01J 23/10* (2013.01); *B01J 23/40* (2013.01); *B01J 35/002* (2013.01); *B01J 35/023* (2013.01); *B01J 35/1019* (2013.01); *B01J 37/0045* (2013.01); *B01J 37/0221* (2013.01); *B01J 37/0248* (2013.01); *B01J 37/035* (2013.01); *C01F 7/02* (2013.01); *C01F 7/021* (2013.01); *B01D 53/949* (2013.01); *B01D 2255/20707* (2013.01); *B01D 2255/90* (2013.01); *C01P 2004/61* (2013.01); *C01P 2004/84* (2013.01); *C01P 2004/86* (2013.01); *C01P 2004/88* (2013.01); *C01P 2006/12* (2013.01); *C01P 2006/14* (2013.01); *C01P 2006/16* (2013.01); *C01P 2006/90* (2013.01)

(58) Field of Classification Search
CPC .......... B01J 21/063; B01J 21/04; B01J 21/06; B01J 21/12; B01J 23/10; B01J 23/40; B01J 35/002; B01J 35/023; B01J 35/1019; B01J 37/0045; B01J 37/0221; B01J 37/0248; B01J 37/035; B01J 37/02; C01F 7/02; C01F 7/021; B01D 2255/90; B01D 2255/20707; C01P 2006/90; C01P 2006/12; C01P 2006/14; C01P 2006/16; C01P 2004/61; C01P 2004/84; C01P 2004/86; C01P 2004/88
See application file for complete search history.

(56) References Cited

U.S. PATENT DOCUMENTS

| 2,804,433 | A | 8/1957 | Hervert | 252/453 |
| 3,207,700 | A | 9/1965 | Saffer | 252/443 |
| 3,269,939 | A | 8/1966 | Marechal | 208/143 |
| 3,518,206 | A | 6/1970 | Sowards | 252/446 |
| 3,526,602 | A | 9/1970 | Fotis, Jr. | 252/430 |
| 3,703,461 | A | 11/1972 | Hansford | 208/143 |
| 3,718,494 | A | 2/1973 | Jacobson | 106/291 |
| 3,923,692 | A | 12/1975 | Braithwaite | 252/455 |
| 3,925,253 | A | 12/1975 | Stephens | 252/455 |
| 4,059,544 | A | 11/1977 | Yamaguchi | 252/471 |
| 4,070,286 | A | 1/1978 | Iler et al. | 210/31 C |
| 4,105,426 | A | 8/1978 | Iler et al. | 65/18 |

(Continued)

FOREIGN PATENT DOCUMENTS

| DE | 05 3930318 | 3/1990 | |
| JP | 2000345072 | 12/2000 | |
| WO | 2008045175 | 4/2008 | 21/12 |

OTHER PUBLICATIONS

EP Supplemental Search Report dated Apr. 19, 2013 for EP Application No. 10822453.6.

(Continued)

*Primary Examiner* — Melvin C Mayes
*Assistant Examiner* — Smita Patel
(74) *Attorney, Agent, or Firm* — Charles A. Cross

(57) ABSTRACT

The present invention is directed to a method of forming titania clad high surface area alumina suitable as a support for forming noble metal catalysts. The resultant catalysts exhibit resistance to poisoning by sulfurous materials and, therefore, are useful in applications directed to internal combustion engine emission conversion and the like. The present invention provides a commercially feasible and cost effective method of forming a highly desired support for noble metal catalyst application. The process comprises forming a slurry of porous alumina particulate suitable as a catalyst support for the intended application, mixing said slurry with a solution of titanyl sulfate having a pH of about 1, increasing the pH of the mixed slurry/solution at a slow rate of from 0.05 to 0.5 pH unit per minute to a pH of ≤4 by the addition of a basic solution, allowing the resultant slurry to age for a period of from 10 to 120 minutes, separating the treated porous alumina particulates and washing same free of sulfate with a weak base, drying and calcining said particulates to produce titania clad alumina particulate product. The resultant material exhibits a normalized sulfur uptake of less than about 45 μg/m²-sample. Such material can subsequently be coated with a noble metal to form the catalyst material.

12 Claims, No Drawings

(56) References Cited

U.S. PATENT DOCUMENTS

| | | | |
|---|---|---|---|
| RE29,771 E | 9/1978 | Cull | 252/455 |
| 4,111,846 A | 9/1978 | Elliott, Jr. | 252/455 |
| 4,146,403 A | 3/1979 | Armanini | 106/291 |
| 4,459,372 A | 7/1984 | Arena | 502/351 |
| 4,593,007 A | 6/1986 | Novinski | 501/105 |
| 4,705,770 A | 11/1987 | Cullo et al. | 502/242 |
| 4,708,945 A | 11/1987 | Murrell et al. | |
| 4,759,918 A | 7/1988 | Homeler | 423/213.5 |
| 4,764,498 A | 8/1988 | Wissner | 502/251 |
| 4,778,779 A | 10/1988 | Murrell | 502/263 |
| 4,959,338 A | 9/1990 | Miura | 502/263 |
| 5,182,016 A | 1/1993 | Funkenbusch et al. | 502/402 |
| 5,271,833 A | 12/1993 | Funkenbusch et al. | 502/402 |
| 5,338,354 A | 8/1994 | Melville | 106/442 |
| 5,395,808 A | 3/1995 | Miller et al. | 502/7 |
| 5,456,749 A | 10/1995 | Iwasa | 106/417 |
| 5,656,546 A | 8/1997 | Kobayashi et al. | 423/239.1 |
| 5,702,519 A | 12/1997 | Nitta | 106/442 |
| 5,804,152 A | 9/1998 | Miyoshi et al. | 423/213.5 |
| 5,840,111 A | 11/1998 | Wiederhoft | 106/436 |
| 5,922,294 A | 7/1999 | Chattha et al. | 423/213 |
| 6,036,847 A * | 3/2000 | Ziebarth et al. | 208/113 |
| 6,280,608 B1 | 8/2001 | Jensen | 208/143 |
| 6,288,007 B1 | 9/2001 | Lindblad | 502/261 |
| 6,399,530 B1 | 6/2002 | Chen | 502/64 |
| 6,534,437 B2 | 3/2003 | Eijsbouts et al. | 502/313 |
| 6,638,889 B1 | 10/2003 | Van Berge | 502/300 |
| 6,653,356 B2 | 11/2003 | Sherman | 516/90 |
| 6,713,032 B2 | 3/2004 | Mizobuchi et al. | 423/247 |
| 6,756,515 B2 | 6/2004 | Rende | 585/444 |
| 6,919,295 B2 | 7/2005 | Gaffney et al. | 502/311 |
| 6,992,040 B2 | 1/2006 | Muller | 502/327 |
| 7,022,646 B2 | 4/2006 | Li | 502/339 |
| 7,037,875 B2 | 5/2006 | Hu et al. | 502/304 |
| 7,169,433 B2 | 1/2007 | Jenkins | 426/638 |
| 7,169,443 B2 | 1/2007 | Kishimoto | 427/215 |
| 7,348,263 B2 | 3/2008 | Hashimoto | 438/460 |
| 7,638,459 B2 | 12/2009 | Rende | 502/300 |
| 7,815,792 B2 | 10/2010 | Bauer | 208/243 |
| 2002/0157535 A1 | 10/2002 | Kanazirev | 95/96 |
| 2003/0143421 A1 | 7/2003 | Price | 428/689 |
| 2003/0162849 A1 | 8/2003 | Van Berge | 518/716 |
| 2005/0124490 A1 | 6/2005 | Timkin | 502/325 |
| 2005/0129601 A1 | 6/2005 | Li | 423/239.2 |
| 2005/0272827 A1 | 12/2005 | Lok | 518/716 |
| 2005/0284799 A1 | 12/2005 | Bauer | 208/213 |
| 2006/0034739 A1 | 2/2006 | Drews-Nicolai et al. | 106/436 |
| 2006/0270865 A1 | 11/2006 | Wang | 554/174 |

OTHER PUBLICATIONS

Pt—Ti02 Gamma Al2O3 Catalyst by Neuman Solange de Resende et al.; Journal of Catalysis, v 183, 6-13, 1999.

Alumina—Titania Nanofibers Synthesis Using Different Techniques of Ti Addition by Antonio Munoz-Lopez; Abstracts from the 20th NAM Catalysis Society Meeting, May 2007.

Structure of Anhydrous Titanyl Sulfate, Titanyl Sulfate Monohydrate and Prediction of a New Structure by B.M. Gatehouse et al.; Acta Crystallographica—section B Structural Science vol. 49 (3), p. 428-435.

Advanced Inorganic Chemistry 4th Edition by Wilkinson Cotton; p. 696.

* cited by examiner

SULFUR RESISTANT CLADDED TITANIA—ALUMINA SUPPORTS

CROSS-REFERENCE TO RELATED APPLICATIONS

This application claims the benefit of the filing date of U.S. Provisional Patent Application No. 61/249,824 filed Oct. 8, 2009, and International Application No. PCT/US2010/051072 filed Oct. 1, 2010, the disclosure of which is hereby incorporated by reference.

BACKGROUND OF THE INVENTION

The present invention is directed to a method of forming titania clad alumina particulates having high resistance to sulfur degradation. The products formed by the present method provide improved catalyst supports and resultant catalysts. These catalysts include those useful for treating internal combustion engine exhaust products, especially exhaust products of diesel engines, as well as other applications, including those used in Fischer-Tropsch and other hydrogenation reactions. The method of the present invention provides an economical and commercially desirable means of forming a substantially uniform cladding of titania on alumina particulate. The product achieved by the present invention retains the high surface area and porosity of the initial alumina while substantially reducing the alumina surface not having a protective titania coating thereon from those attained by conventional impregnation processes.

The exhaust products of internal combustion engines are known health hazards to human beings, animals as well as plant life. The pollutants are, in general, unburnt hydrocarbons, carbon monoxide, nitrogen oxides, as well as residual amounts of sulfur and sulfurous compounds. These pollutants have been successfully treated by contact with multifunctional, noble metal catalysts which are capable of converting a high percentage of the pollutants into less harmful products of carbon dioxide, water (steam) and nitrogen. However, the sulfur and sulfurous compounds and agents present in fuels, especially from middle cut petroleum feedstock ($C_{10}$ and greater hydrocarbons), and, in turn, in exhaust streams have been known to poison the noble metals resulting in lessening their catalytic effectiveness and life. The removal of such sulfurous materials has been deemed difficult to accomplish due to the complex nature and scope of such materials.

The sulfurous materials contained in fuels tend to oxidize in the combustion process to form sulfur oxides. In turn, these sulfur oxides may then react with the alumina supports of the catalytic materials located downstream of the engine to convert it into sulfates that reside on the surface of the aluminum oxide support. It is believed that such coverage of the alumina surface with sulfate generally causes a loss in catalyst activity. In addition, the sulfates initially residing on the alumina surface may further convert into sulfuric acid which is then carried out of the system as part of the exhaust stream.

Catalytic supports are generally formed of high porosity inorganic oxides, such as alumina and titania. For example, titania is known to have a much lower tendency to react with sulfates and, therefore, exhibits a greater durability in the presence of gaseous vapors that contain sulfurous materials and the like. However, when titania is used as a support, it does not exhibit the hydrothermal stability required to form effective emission control catalyst supports. When exposed to equivalent temperatures, titania sinters to a greater extent than alumina and, thus, causes the material to have lower surface area and, hence, lower catalytic activity than its alumina counterpart. Thus, titania, per se, does not provide a desirable catalyst support material.

In attempts to overcome the poor hydrothermal properties associated with titania, alumina supports have been coated with titania either by conventional impregnation or by co-precipitation techniques (See US Published Application 2005/0272827). In both instances, the resultant support retains a significant amount of exposed alumina because of the tendency of the titania or its precursor to be rejected by the alumina and because the titanium material, when initially deposited, acts as nucleating cite for further deposition. The result is a coating that is composed of discontinuous islands of titanium material coated over the alumina underlayment support. Conventionally coated supports still have large amounts of exposed alumina surface area and, therefore, exhibit a high degree of susceptibility to sulfur poisoning. Further, titania applied by conventional methods tends to precipitate in the pores of the alumina causing blockages of the pores and, thus, reducing the surface area upon which the noble metal may reside.

U.S. Pat. No. 4,759,918 discloses a catalytic composite deemed useful in the treatment of diesel soot. The composite comprises a sulfur resistant refractory inorganic oxide, such as alumina that has been wash coated with an aqueous slurry of preformed titania. Although the product may exhibit some resistance to sulfur degradation, the coating does not protect the entire surface of the alumina or must be applied in such large quantities that it not only covers the surface but also bridges the pore openings of the alumina.

U.S. Pat. No. 4,705,770 discloses a method of preparing an anatase titania catalyst support by forming a solution of ammonium titanyl sulfate from titanium tetrachloride and impregnating a porous substrate multiple times with the formed solution. After each impregnation, the deposited material is decomposed by treating it to high temperatures and then calcined to transform the titanium into anatase titania. The resultant product has a thick, irregular coating of titania and a substantial loss of porosity of the substrate.

US Published Application 2005/0272827 discloses a catalyst used in hydrogenation and Fischer-Tropsch reactions composed of cobalt on a titania coated support. The titania coated support is formed by conventional impregnation techniques using organotitanate compounds and organic liquids to achieve its coatings. Such processes require expensive organic starting compounds and liquids that call for special techniques and equipment (e.g. explosion proof equipment, etc.) which makes the process prohibitive for commercial application.

U.S. Pat. No. 7,169,433 discloses a process of coating a base particle, such as iron, by forming an aqueous suspension of the base particle having a pH of between 7 and 12, adding a hydrogen peroxide/ammonia solution also having a pH of from 7 to 12 and containing peroxotitanic acid. As the peroxotitanic acid solution is introduced into the suspension, it decomposes and forms a titania film coating on the base powder.

Japanese Laid Open Application 2000-345072 discloses a method of forming a blue powder having smooth surfaces. The powder is formed by first coating iron magnetite powder with silica followed by precipitation of preformed titania. The titania was initially formed from an aqueous solution of titanyl sulfate held at a buffered pH of 5.4 and elevated temperature to cause the water to hydrolyze the titanyl sulfate to titania. Very dilute amounts of the titania formed solution was then contacted with the silica coated magnetite under ultrasonic agitation to provide a coating thereon.

Vapor deposition using titanium tetrachloride has been suggested (See U.S. Pat. No. 4,459,372) to achieve a uniform coating of titania. However, such a process is not commercially desirable due to the handling problems associated with titanium tetrachloride reactant and the elaborate equipment required for vapor deposition processing. Further efforts to produce a titania cladding has included chemical vapor deposition of titania onto the surface of alumina (See US Published Application 2005/0129601; US Published Application 2003/0143421 and U.S. Pat. No. 7,022,646). Again such a method requires elaborate equipment and processing.

The present invention brings together both of the beneficial aspects of the materials forming titania clad alumina particulates and the feasible and cost effective method steps that readily forms an improved final catalyst capable of exhibiting high sulfate resistance, durability, and catalyst activity after exposure to high temperatures and processing or exhaust streams containing sulfurous materials. The present invention is directed to an economical and commercially feasible method to form a highly dispersed, substantially uniform layer of titania on a support oxide composed of the thermally stable alumina. Further, the presently achieved titania cladding has dimensions that allow it to be formed on the surface of the alumina without causing blockages of its pores to, thus, substantially retain the high surface area of the initial alumina particulate.

It is desired to provide an economical and commercially feasible method to form a titania clad alumina catalyst support capable of enhancing the activity of noble metals in the conversion of carbon monoxide and hydrocarbon materials to carbon dioxide and water while exhibiting high tolerance to the presence of sulfur and sulfurous compounds.

It is further desired to form an alumina catalyst support having titania cladding on the support's surface. The cladding should be substantially continuous over the surface of the alumina, cause no or only minor reduction of the surface area of the porous alumina (e.g. by not clogging the pores) and provide high efficiency to tolerate the presence of sulfur and sulfurous compounds and agents.

It has been presently found that alumina particulate material clad with titania formed according to the present invention provides a support for noble-metal catalysts. The resultant supports exhibit enhanced sulfur tolerance in comparison to supports having the same titania content formed by conventional impregnation or co-precipitation methods. The method of the present invention provides an economic and commercially feasible method of forming the desired titania clad alumina support product.

The method of the present invention permits the economical formation of desired alumina support and resultant catalyst for effectively treating emission product streams of internal combustion engines, especially diesel fuel engines, as well as other applications. The thin, substantially uniform nature of the titania cladding achieved by the present invention allows for improved mass transfer while not imparting bridging of the pore surfaces which would reduce the porosity of the alumina core. All of the benefits can be achieved using readily available, easily handled and processed materials and steps to, thus, provide an economic, commercially feasible method described herein below in full.

SUMMARY OF THE INVENTION

The present invention is directed to a method of forming titania clad, high surface area alumina suitable as a support for noble metal catalysts and to the product thus formed. The titania clad product of the present method and catalysts formed therefrom exhibit high resistance to poisoning by sulfurous materials. The resultant product is especially useful in applications directed to internal combustion engine emission conversion.

Specifically, the present invention is directed to a novel, commercially feasible and cost effective method of forming high surface area alumina particulate having from about 1 to 50 weight percent, preferably from 5 to 40 and most preferably from 10 to 30 weight percent titania with respect to the resultant support in the form of a thin, substantially uniform titania cladding on the surface of the alumina.

The resultant titania clad high surface area alumina particulate formed according to the present invention unexpectedly exhibits enhanced efficiency in sulfur tolerance of less than about 40 $\mu g/m^2$ as shown by normalized sulfur uptake (NSU) described herein below. The achieved NSU efficiency is about two fold greater when compared to supports formed by conventional impregnation techniques. Thus, the present method provides a resultant supported catalyst having superior performance and effective life in comparison to that of alumina support having the same weight percentage of titania thereon formed by conventional techniques.

In addition, the titania clad alumina particulate material formed according to the present invention provides a support wherein the titania remains in an amorphous state even after subjection to high temperatures, such as those used in calcining of the support product.

The method of the present invention comprises forming a slurry of porous alumina particulate suitable as a catalyst support for an intended application, mixing said slurry with a solution of titanyl sulfate having a pH of about 1, increasing the pH of the slurry mixture at a slow controlled rate of from 0.005 to 0.5 pH unit per minute by the addition of an dilute aqueous solution of base to raise the pH of the slurry to about 3.5 to 4, separating the treated porous alumina particulates and washing same free of sulfate ions followed by drying and calcining the resultant particulates to produce titania clad alumina product. Such material can be subsequently coated with a noble metal to form a desired catalyst material.

DETAILED DESCRIPTION

The support formed by the method of the present invention is generally in the form of particulate comprising alumina having a cladding of titania thereon.

The present invention is directed to a method of providing an improved alumina support that is highly resistant to poisoning by sulfurous materials. The method fully described herein below is useful in forming a support for noble metal exhaust catalysts having enhanced tolerance to the presence of sulfurous materials normally found in emission product streams of internal combustion engines and the like.

The following terms, used in the present description and the appended claims, have the following definitions:

The term "support" refers to a material onto which an active catalytic material is applied. In the present invention, the support product achieved by the present process comprises a high surface area, titania clad alumina particulate capable of having catalytic amounts of metals, e.g. noble-metal deposited on its surface.

The term "particulate" refers to shaped particles in the form of powder, beads, extrudates, and the like. In this teaching, it is used in reference to cores, supports as well as the resultant supported noble metal products. The particulates of alumina useful in the present process normally have particle size of from about 1 to about 200 $\mu m$.

The term "alumina" refers to any of the forms of aluminum oxide alone or as a mixture with small amounts of other metals and/or metal and non-metal oxides.

The term "core" refers to alumina particulate prior to cladding according to the present invention. Such unclad alumina particulate material has been utilized as support material by the prior art.

The term "coating" refers to a surface covering which is in the form of a discontinuous coverage of irregular thickness on core particulates. Coatings are conventionally formed by impregnation and co-precipitation processes known in the art and are of relatively thick, irregular design. Where the coating exists, it commonly has a thickness of at least about ten (10) molecule (titania) thickness. With respect to titania coated alumina products, the coating can be viewed as a discontinuous film on the alumina substrate as shown by the high normalized sulfur uptake (NSU) exhibited by coated products.

The term "cladding" or "clad" refers to a surface covering which is in the form of a relatively thin (e.g. a mono-, di- or tri-molecular layer, substantially uniform and continuous coverage on alumina core particulates. Normally, the thickness is less than half of the average pore diameter of the pores of the alumina support and generally is a thickness of from 5 to 50 Angstroms, preferably from 5 to 25 Angstroms. Thus, a clad support provides a distinctly more efficient coverage per unit of the deposited material than attainable by coated products formed by conventional impregnation or co-precipitation methods. Clad particulate material exhibit lower NSU values (defined below) than titania-coated alumina product having the same weight percent titania formed by conventional impregnation techniques.

The term "adsorbed" or "adsorption" shall refer to the phenomena of adsorption (the ability to hold or concentrate gases, liquid or dissolved substances on the surface of the adsorbent [e.g. alumina]) or absorption (the ability to hold or concentrate gases, liquids or dissolved substances throughout the body of the absorbent [e.g. alumina]) or both, which can be conducted either by chemical reaction of an ionic, covalent or mixed nature or by physical forces.

The term "sulfurous material" refers to sulfur, sulfur oxides and compounds and species containing sulfur atoms.

The present process readily provides an improved support composed of high surface area alumina particulate having a titania cladding thereon in sufficient amount and form to exhibit superior inhibition to adsorption of sulfurous material, as fully described herein below.

The alumina may be selected from any form or mixtures of aluminum oxide desired for the particular application contemplated. It is long been known that alumina is not simply represented by the formula $Al_2O_3$. Instead such materials usually are "hydrates" in the sense that they contain varying amounts of water which can be removed by treatment to elevated temperatures. In large part the "hydrates" are manifested as surface hydroxyl groups, themselves important modifiers of the surface properties of the alumina. Further, it is well known that alumina or aluminum oxide occurs in various crystalline modifications with the more common ones being:

gamma-alumina, a form stable up to about 900° C. at which temperature it converts to delta-alumina (a preferred material);

delta alumina, a form stable up to about 1000° C. at which temperature it converts to theta-alumina;

theta-alumina, a form stable up to about 1100° C. at which temperature it converts to alpha-alumina;

aluminum monohydrate or Böhmite, which is prepared by a variety of routes such as the addition of ammonium hydroxide to an aqueous solution of aluminum chloride. The material initially precipitates as an amorphous floc, which rapidly converts to crystalline Böhmite. Alternately, it is prepared by reaction of aluminum sulfate with sodium aluminate;

aluminum trihydate or Gibbsite;

other forms of hydrated aluminum oxide such as bayerite and the like;

other forms of alumina, such as eta-alumina and the like.

Although any of the above aluminas may be utilized, the preferred alumina for use as a core in forming the support by the present invention is selected from delta-alumina, gamma-alumina or mixtures thereof.

The alumina can be doped with conventional dopants, such as transition metals and metal oxides, alkaline earth metal oxides, rare-earth oxides, silica and the like and mixtures thereof. Examples of such dopants include rare earth metals and their oxides such as magnesia, calcia, nickel oxide, zinc oxide, silica and the like with lanthania being a preferred dopant. A dopant, when used, is normally present in small amounts, such as from 0.1 to 10, preferably from 1 to 5 weight percent of the high surface area alumina particulate core material (prior to cladding according to the present invention).

The dopants are normally present in the alumina particulate to impart particular properties, such as hydrothermal stability, abrasion strength, catalytic activity promotion and the like, as is well known to the artisan.

The high surface area alumina particulate may be in the form of powder (preferred) having a average particle size of from about 1 to 200 μm, preferably from 10 to 100 μm; or beads having an average particle size of from 1 mm to 10 mm. Alternately, the alumina particulate can be in the form of pellets or extrudate (e.g. cylindrical shape). The size and particular shape being determined by the particular application contemplated.

In all instances, the base (core) of the support composed of alumina particulate should have a high (BET) surface area of at least about 20 $m^2/g$, such as from about 20 to about 400 $m^2/g$, preferably from about 75 to 350 $m^2/g$ and more preferably greater than 100 $m^2/g$, such as from 100 to 250 $m^2/g$. The core alumina particulate has a pore volume of at least about 0.2 cc/g, such as from 0.2 to 2 cc/g and preferably from 0.5 to 1.2 cc/g and an average pore diameter within the range of 50 to 1000 Angstroms, preferably greater than 100 Angstroms, such as from 100 to 500 Angstroms and more preferably, from 100 to 300 Angstroms. Such high surface area particulate provides ample surface area for deposition of a noble metal catalyst and having it readily contacted with, for example, an emission stream to provide effective catalytic conversion of the noxious products to more benign emission products or a reaction stream to enhance the catalytic reaction rate.

The particulate aluminum hydrates are normally calcined to remove residual water and to convert aluminum hydroxyl groups to their oxide counterpart (although residual hydroxyl groups remain as part of the alumina structure, especially on the surface of the particles).

Alumina particulates, suitable as a core for the present clad support product, are commercially available. However, particular design criteria (such as use of particular dopant, particulate pore volume, and the like) for a particular application may require fabrication of the alumina particulate by known methods.

It has been previously suggested to combine alumina with titania either by co-precipitation or impregnation techniques to achieve a support product. As discussed above, alumina supports having fixed amounts of titania, which are generated by these techniques still have significant amount of exposed alumina surface capable of adsorbing sulfurous material at levels far greater than the titania-clad alumina achieved by the present invention.

When the titania is made part of the support by conventional impregnation techniques of the prior art (See, for example, U.S. Pat. No. 4,705,770), the titania is deposited on the surface of the alumina core particulate. In this case, the titania provides a patch-like pattern of relatively thick, discontinuous coverage which results in lower ratios of titania to alumina surfaces with respect to the resultant product. Further, the titania coatings formed by impregnation tends to cause blockages of the pores of the alumina and, thus, reduce the surface area of the resultant coated support.

It has now been found that alumina core particulate can be clad by a commercially feasible and economic method with small amounts of titania to provide a support that exhibits a high tolerance to the presence of sulfurous materials per unit of titania relative to titania coated alumina. The method of the present invention provides a support product capable of forming, in commercially desirable manner, a catalyst having an extended useful life for emission control. The formation of the present titania clad alumina particulate has been accomplished by the application of certain specific combination of process parameters, as fully described herein below.

The alumina particulate is first formed into an aqueous slurry in which the solid concentration is within the range from 1 to 30, preferably from 2 to 20 and most preferably from 5 to 15 weight percent. The slurry should be sufficiently fluid to readily allow mixing of the slurry with the titanyl sulfate solution described below. The specific concentration used within this range will depend on the physical properties (e.g. surface area, void volume, etc. as well as particle size and shape) of the alumina forming the slurry. The concentration should be such that mixing of the slurry can be readily accomplished.

The slurry can have a temperature ranging from ambient to 100° C., preferably from 20° to 50° C. and most preferably from 20° to 35° C. Although elevated temperature conditions may be used, they are not required. Higher temperatures may be used but require the use of pressurized vessels. The increased equipment and handling costs to provided elevated temperatures above that indicated above are not necessary.

An aqueous acidic solution of titanyl sulfate is used. The pH of the solution should be from 0.5 to 1.5 with 0.9 to 1.2 being preferred. The acid providing the pH is preferably sulfuric acid although other inorganic acids, such as nitric or hydrochloric acid or mixtures thereof may be used. The titanyl sulfate material should not be associated with organic anions, such as alkoxides and the like. The concentration of the titanyl sulfate (as titania) should be from 1 to 30, preferably from 10 to 30 and most preferably from 20 to 30 weight percent in the solution. Although it is preferred to cause the solution to have a temperature substantially the same as that of the alumina slurry prior to mixing of the solution with the slurry, this condition is not required.

The amount of acidic titanyl sulfate aqueous solution to be introduced into the alumina slurry will depend on the concentration of titanyl sulfate in the solution and the amount required for cladding. The amount required can be readily calculated based on the knowledge of the surface area of the alumina being used, the titanyl sulfate to titania molecular weight conversion and the desired cladding thickness to be part of the resultant clad alumina product. This amount can be readily calculated by the artisan.

Normally, the amount of titanyl sulfate used with respect to the solution (calculated as titania) to total oxides (i.e. alumina+titania) of the resultant clad product should be from 1 to 50, preferably from 5 to 40 and most preferably from 5 to 30 weight percent. The appropriate amount can be readily determined by the artisan.

The aqueous solution of titanyl sulfate is mixed with the alumina slurry to form a uniform mixture of the materials. The temperature of the mixture should be sufficient to maintain the titanyl sulfate in solution. Such temperature is normally in the range of from ambient to 100° C. preferably from 20° to 50° C. and most preferably from 20° to 35° C. The mixture should be maintained within this temperature range for a period of time of from about 1 to 120 minutes, preferably from about 1 to 30 minutes and most preferably from about 1 to 15 minutes while maintaining sufficient agitation to cause and maintain a uniform mixture.

During the initial agitation, if necessary to maintain the pH at from 0.5 to 1.5, the mixture may be treated with a water soluble acid in sufficient amounts to cause the pH of the mixture to be about 1 with a pH of from 0.5 to 1.5 with from 0.9 to 1.2 being preferred. The acid may be selected from any inorganic mineral acid with sulfuric acid being preferred.

It is believed, though not meant to be a limitation on the claimed invention that at the low pH described above, the titanyl species can be generally represented by the stoichiometry specie $[TiOSO_4]\cdot nH_2O$. The actual nature of the titanium-containing species in titanyl sulfate solutions is actually not well determined. Cotton and Wilkinson (Advanced Inorganic Chemisty, $4^{th}$ edition, p. 696) state that there are infinite zigzag —Ti—O—Ti—O— chains with coordinated sulfate groups and water. The species that are likely to be present in concentrated aqueous sulfate solutions can also be inferred from the crystal structure of solid titanyl sulfate monohydrate (Gatehouse, et al., Acta. Cryst. (1993) B49, 428-435). These studies show that the structure consists of chains of $[Ti-O]_n^{2+}$ groups in one dimension that are linked by sulfate groups to form the three-dimensional structure. The titanyl species present at the low pH at the commencement through termination of the present titration may be attracted to the alumina through displacement of the coordinated sulfate and condensation of the unsaturated titanium centers with hydroxyl groups located throughout the surface of the alumina. The above leads to the consideration that the species present in the highly acidic titanyl sulfate solutions required by the present process are unique and can not be attained in other ways.

The mixture forming the acidic slurry is then treated with an aqueous solution of a base. The base can be selected from an inorganic base or organic base with inorganic bases being preferred. Examples of suitable inorganic bases are ammonium hydroxide, ammonium carbonate, ammonium bicarbonate, an alkali metal hydroxide or carbonate or bicarbonate or an alkaline earth metal hydroxide, carbonate or bicarbonate or mixtures thereof. Alternately, water soluble, organic bases may be used as, for example, quaternary amines such as tri($C_1$-$C_3$) alkylammonium compounds as well as mono-, di- and tri-(C1-$C_3$) alkanolamines. Preferred bases are weak inorganic bases, such as a base selected from ammonium hydroxide, ammonium carbonate and ammonium bicarbonate. The base should be added at a substantially constant rate to cause the pH of the mixture to rise to a pH of between 3.4 and 4 (e.g. 3.5 to 4), preferably between 3.5 and 3.7 and most preferably up to about 3.6. The addition of the base should be conducted at a substantially constant, slow rate with continuous mixing to cause uniform distribution of the base throughout the mixture. In general, the addition of the base should be such as to raise the pH of the mixture at a rate of from 0.05 to 0.5 pH unit per minute, preferably from 0.05 to 0.25 pH unit per minute. High rates of addition should be avoided.

The resultant mixture is allowed to age at the terminal pH of 3.4 to 4 for a period of time of from about 10 to 120 minutes (e.g. 15 to 60 minutes) with from 30 to 60 minutes being preferred. If the pH of the resultant mixture fluctuates to a pH outside of the indicated pH range, it should be adjusted to be within the indicated range during the aging period.

The pH adjustment of the mixture can be performed at any temperature, such as from ambient to 100° C., with from 20° to 50° C. being preferred and 20° to 35° C. being most preferred.

The formed clad alumina particulates may then be separated from the slurry by filtration (preferred), decanting of excess liquid or the like or may be allowed to remain in the slurry while being washed to remove the sulfate anions. The washing may be conducted using hot water or an aqueous solution of a base, such as ammonium hydroxide, ammonium carbonate, ammonium bicarbonate (preferred), an alkali metal hydroxide or mixtures thereof. The pH of the wash solution should be from about 7 to about 11. Normally the volume amount of wash solution used to treat either the slurry or the solid clad alumina particulate material is in excess of the volume of initial slurry used, with from 2 to 4 times, preferably from 2.5 to 3.5 times being preferred. The exact amount may be readily determined by the amount of wash solution required to provide a product that is substantially free of sulfate. It is preferred to cause the product having less than 0.5, more preferably less than 0.3 and most preferably less than 0.2 weight percent sulfate. The appropriate amount of wash solution will depend on the amount of titanyl sulfate used in the initial steps of the process, the type and concentration of base used in the wash solution determined to provide a product substantially free of sulfate. Such amount can be readily determined by those skilled in the art by analytical means.

The washed product may be formed into a powder product by spray drying, flash drying, drum drying or the like. The substantially dried powder product is then calcined at elevated temperatures of from 400° to 1000° C. with from 600° to 800° C. being preferred. This calcination is normally conducted for a period of from about 15 minutes to about 8 hours, with from 1 to 4 hours being preferred and from 1 to 2 hours being most preferred. The resultant powdery product is titania clad alumina. The surface area of the product is substantially the same as that of the starting alumina.

It has been further unexpectedly found that the titania cladding formed according to the present invention remains in an amorphous state even when subjected to calcining temperatures of up to about 750° C. although prior art has indicated that titania forms into its anatase crystalline form at much lower temperatures. This may be further evidence of the thin, spread out nature of the titania cladding presently formed.

The present process forms a highly desired titania clad alumina particulate product using readily available materials, which are treated under easily attained conditions. The present process does not require elaborate equipment, such as explosion proof reactors and the like, the use of hard to handle materials, such as titanium tetrachloride nor the use of costly reactants, such as organotitanyl compounds. Thus, the present process provides a cost effective, commercially feasible process that provides an enhanced titania clad alumina particulate that is resistant to degradation by sulfurous materials.

The resultant product is a high surface area alumina particulate having titania cladding thereon. Unlike prior titania treated alumina products produced by conventional impregnation techniques, the present resultant product retains its high surface area and pore volume properties (thus, showing that the present clad product does not result in deposition which cause bridging of the pore walls to result in pore blockages).

The aqueous titania solution used to contact the alumina particulate should have sufficient concentration of titanyl sulfate to cause the resultant clad alumina product to have from 1 to 50 weight percent titania ($TiO_2$), preferably from 5 to 40 and most preferably from 5 to 30 weight percent titania based on the total weight of the resultant product. Because of the uniformity of the cladding over the surface of the alumina particulate, low amounts of titania, such as from 8 to 20 weight percent and even from 8 to 15 weight percent, can be readily used to provide a support material having very low amount of sulfur adsorption. The titania clad alumina of the present invention is a product having a low normalized sulfur uptake (NSU), as described herein below, of less than about 40 µg/m². It is preferable to have the titania clad alumina have a NSU of less than about 35 µg/m² and NSU values of less than 20 µg/m² can be readily achieved.

Further, the titania clad alumina of the present invention is a product that has a percent reduction in normalized sulfur uptake (i.e. efficiency) when compared to that of unclad alumina that is at least about twice the percentage achievable with the normalized sulfur uptake of titania coated alumina product attained by conventional impregnation processes. The efficiency value achieved by the present product is at least about 45 percent.

The resultant product formed according to the present invention has been found to have a high degree of tolerance to sulfur and sulfurous compounds (e.g. $SO_2$) normally associated with emission product stream of internal combustion engines and the like. It is believed, although not mean to be a limitation on the presently claimed invention, that the presently formed titania clad alumina product is achieved by heterogeneous precipitation, i.e., precipitation on the alumina support. When other techniques are used to form a titania modified alumina, such as impregnation or homogeneous precipitation, the titania forms a coating of a discontinuous form wherein there is large amounts of: 1) uncoated surface formed by general coating defects (which permit sulfur poisoning), 2) plugged pores formed by bridging of the coated material to block off pores (which reduces the surface area and limits the ultimate activity of the catalyst), and 3) free titania particles formed by homogeneous nucleation of the coating material (which contaminates the product with small particles of the titania material).

The method of the present invention described above has been unexpectedly found to readily achieve a titania clad support product having a high efficiency which resists sulfur adsorption while retaining hydrothermal stability. The uniformity and breadth of coverage of titania over the alumina surface can be shown by the effectiveness of the support product to resist sulfur uptake. Sulfur uptake (SU) of a sample can be measured by the following "Sulfation Test". This test is performed by loading 50 mg of sample into a thermo gravimetric analyzer (TGA). The sample is first treated with 107.5 cc/min of He gas for 1 hour at 300° C. After this treatment, the flow of $SO_2$ in He (1.14% $SO_2$) is introduced at 5 cc/min and simultaneously $O_2$ is introduced at 12.5 cc/min. The total flow rate is 125 cc/min and the $SO_2$ concentration is 456 ppm. The sulfur uptake is measured as a function of time. In about 120 minutes, the sulfur uptake is equilibrated, at which point, no more uptake is possible. The Sulfur Uptake (SU) is defined as percentage of weight gained after 120 minutes of time-on-stream. The normalized sulfur uptake (NSU) is calculated by the following formula:

$$NSU = \frac{SU(wt\ \%)}{100 \times SA}$$

where SU is the sulfur uptake in weight percent measured after 120 minutes of time-on stream, and SA is the BET surface area of the sample.

A direct comparison of the titania clad products of the present invention to that of an unclad alumina products ($NSU_{Al}$) or a titania-coated alumina product having the same weight percent titania formed by conventional impregnation techniques (e.g. slurry impregnation) shows that the present titania clad alumina particulate is superior in sulfur tolerance to that of its coated counterpart. In general, the presently formed titania clad alumina support ($NSU_{Ti/Al}$) has efficiency, as defined herein below, of at least 45% and in most cases about 50 percent higher than comparable uncoated alumina support products. Further, this percentage is about two fold or greater than comparable titania coated alumina formed by impregnation techniques.

The percent normalized sulfur uptake efficiency ($\zeta$) of an alumina having a coating or cladding of titania thereon ($NSU_{Ti/Al}$, used herein below represents titania clad or coated product) is calculated by the following formula:

$$\zeta = 100 \cdot \frac{(NSU_{Al} - NSU_{Ti/Al})}{NSU_{Al}}$$

The resulting titania clad alumina particulate, especially when in the form of a powder of from 1 to 200 µm, preferably from 10 to 100 µm, can be further used as a catalytic coating on a low surface area substrate. The substrate structure can be chosen from a variety of forms for a particular application. Such structural forms include monoliths, honeycomb, wire mesh and the like. The substrate structure is normally formed of a refractory material such as, for example, alumina, silica-alumina, silica-magnesia-alumina, zirconia, mullite, cordierite, as well as wire mesh and the like. Metallic honeycomb substrates can also be used. The powder is slurried in water, peptized by the addition of a small amount of acid (preferably mineral acids), and then subjected to milling to cause a reduction in particle size suitable for wash coating application. The substrate structure is contacted with the milled slurry, such as by dipping the substrate into the slurry. The excess material is removed, such as by application of blown air, followed by calcining the coated substrate structure to cause adhesion of the titania clad high surface area alumina particulates of the present invention to the substrate structure.

Noble metals, usually the metals of the platinum group, such as platinum, palladium, rhodium and mixtures thereof, can be applied to the present support in manners well known to those skilled in this art either before wash-coating the titania clad alumina particulate onto a substrate using a suitable conventional noble metal precursor (acidic or basic), or after wash-coating by dipping in a suitable noble-metal precursor solution (either acidic or basic). These noble metal catalysts are described in DE-05 38 30 318, which is incorporated herein in its entirety by reference.

The preferred method is to first form the titania clad alumina followed by application of the noble metal thereto and, finally, to wash-coat the material onto a substrate.

Additional functionality can be provided by mixing the titania-clad product with other oxide supports like, magnesia, ceria, ceria-zirconia, rare-earth oxide-zirconia mixtures etc, and then wash-coating these products onto a honeycomb substrate.

The resultant catalyst can be directly loaded into canisters and the like either alone or in combination with other materials as part of the exhaust emission system of an internal combustion engine. Thus, the exhaust products, which normally comprise oxygen, carbon monoxide, carbon dioxide, hydrocarbons, nitrogen oxides, sulfur, sulfurous compounds and sulfur oxides, are passed through the exhaust system to provide contact with the noble-metal supported catalyst. The result provides conversion of the noxious and harmful exhaust products into more environmentally acceptable materials. When using a catalyst formed with a support provided by the method of the present invention, one achieves a catalyst system having extended active term and of higher overall activity than would be achieved with catalysts having supports either with no titania or with titania-alumina formed from conventional co-precipitation or impregnation techniques.

The following examples are given as specific illustration of the claimed invention. It should be understood, however, that the invention is not limited to the specific details set forth in the examples. All parts and percentages in the examples and in the remainder of the specification are by weight unless otherwise specified.

Further, any range of numbers recited in the specification or claims, such as representing a particular set of properties, units of measure, conditions, physical states or percentages, is intended to literally incorporate expressly herein by reference or otherwise, any number falling within such range, including any subset of numbers within any range so recited.

EXAMPLES

Comparative Core Material Example 1-CM

A commercial lanthana (4 wt %) doped γ-alumina (Grace Davison Grade MI-386) having a BET surface area of 182 m$^2$/g and pore volume of 0.77 cc/g, was tested for sulfur uptake by loading 50 mg of sample into a thermo gravimetric analyzer (TGA). The sample was first treated with 107.5 cc/min of He gas for 1 hour at 300° C. After this treatment, the flow of SO$_2$ in He (1.14% SO$_2$) was introduced at 5 cc/min and simultaneously O$_2$ was introduced at 12.5 cc/min. The total flow rate was 125 cc/min and the SO$_2$ concentration was 456 ppm. The sulfur uptake was measured as a function of time over a 120 minute period. The Sulfur Uptake (SU) as a percentage of weight gained after 120 minutes of time-on-stream was calculated and the normalized sulfur uptake (NSU) was also calculated to be sulfur uptake (SU) equal to 1.25 wt % and NSU equal to 68.7 µg/m$^2$—and is reported in Table 1 herein below.

Comparative Core Material Example 2-CM

A commercial lanthana (4 wt %) doped γ-alumina Grace Davison Grade MI-386 was tested for sulfur uptake in the same manner as described in Example 1 herein above except that the sample was first calcinations at 1000° C. for 2 hours in a muffle furnace. The BET surface area of the calcined sample was 135 m$^2$/g. The sulfur uptake (SU) was 0.97 wt % and NSU was 71.9 µg/m$^2$-sample and these results are reported in Table 1 herein below.

Comparative Core Material Example 3-CM

A commercial undoped γ-alumina (Grace Davison Grade MI-307) was tested for sulfur uptake in the same manner as described in Example 1 herein above. The sample was analyzed to have a BET surface area of 175 m$^2$/g and the pore volume was 0.77 cc/g. The sulfur uptake (SU) was 0.91 wt % and NSU was 52 μg/m$^2$-sample and these results are reported in Table 1 herein below.

Comparative Core Material Example 4-CM

A commercial undoped δ-alumina (Grace Davison Grade MI-407) was tested for sulfur uptake in the same manner as described in Example 1 herein above. The sample was analyzed to have a BET surface area of 123 m$^2$/g. The sulfur uptake (SU) was 0.66 wt % and NSU was 53.6 μg/m$^2$-sample. These results are reported in Table 1 herein below.

Comparative Coated Example 1-C

A 5% TiO$_2$ coating on alumina (MI-386) was prepared as follows. 10 parts of MI-386 was slurried in 40 parts of water. 2.5 g of titanium dioxide sol (Millenium Chemicals) containing 20 wt % TiO2 was added to the slurry with constant stirring. The mixture was evaporated to dryness on a hot plate with constant stirring to get a free flowing powder. The powder was then calcined at 700° C. for 2 hours. The sample was analyzed to have a BET surface area of 184 m$^2$/g. The sulfur uptake (SU) was analyzed in the same manner as described in Example 1-CM and determined to be 0.97%, and have an NSU of 52.7 μg/m$^2$-sample. These results are reported in Table 1 herein below.

Comparative Coated Example 2-C

A 10% TiO$_2$ coating on alumina (MI-386) was prepared in the same manner as described in Comparative Example 1-C, except that 5.0 g of Ti-solution was added to a slurry containing 9.48 parts of alumina particulate (MI-386). The powder was then calcined at 700° C. for 2 hours. The sample was analyzed to have a BET surface area of 179 m$^2$/g. The sulfur uptake (SU) was analyzed in the same manner as described in Example 1-CM and determined to be 0.94%, and have an NSU of 52.5 μg/m$^2$-sample. These results are reported in Table 1 herein below.

Comparative Coated Example 3-C

The sample was prepared in the same manner as described in Comparative Example 2-C, except that the sample was calcined at 1000° C. for 2 hours. The sample was analyzed to have a BET surface area of 129 m$^2$/g. The sulfur uptake (SU) was analyzed in the same manner as described in Example 1-CM and determined to be 0.82%, and have an NSU of 63.6 μg/m$^2$-sample. These results are reported in Table 1 herein below.

Comparative Coated Example 4-C

A 20% TiO$_2$ coating on alumina (MI-386) was prepared in the same manner as described in Comparative Example 1-C, except that 10 g of Ti-sol was reslurried in a slurry containing 8.42 parts of alumina particulate (MI-386). The powder was then calcined at 700° C. for 2 hours. The sample was analyzed to have a BET surface area of 169 m$^2$/g. The sulfur uptake (SU) was analyzed in the same manner as described in Example 1-CM and determined to be 0.94%, and have an NSU of 55.6 μg/m$^2$-sample. These results are reported in Table 1 herein below.

Comparative Coated Example 5-C

A 30% TiO$_2$ coating on alumina (MI-386) was prepared in the same manner as described in Comparative Example 1-C, except that 15 g of Ti-sol was reslurried in a slurry containing 7.36 parts of alumina particulate (MI-386). The powder was then calcined at 700° C. for 2 hours. The sample was analyzed to have a BET surface area of 163 m$^2$/g. The sulfur uptake (SU) was analyzed in the same manner as described in Example 1-CM and determined to be 0.81%, and have an NSU of 50.0 μg/m$^2$-sample. These results are reported in Table 1 herein below.

Comparative Coated Example 6-C

A 10% TiO$_2$ coating on alumina (MI-307) was prepared in the same manner as described in Comparative Example 1-C, except that 5.0 g of Ti-sol was reslurried in a slurry containing 9.48 parts of alumina (MI-307). The powder was then calcined at 700° C. for 2 hours. The sample was analyzed to have a BET surface area of 169 m$^2$/g. The sulfur uptake (SU) was analyzed in the same manner as described in Example 1-CM and determined to be 0.71%, and have an NSU of 42 μg/m$^2$-sample. These results are reported in Table 1 herein below.

Example 1

A nominal 20 wt % titania cladded alumina was prepared as follows. 21.05 g of commercial lanthana (4.0 wt. %) doped alumina (Grace Davison Grade MI-386) was slurried in 225 g of DI water. To this slurry, 54.7 g of a titanyl sulfate solution (equivalent to 9.17 wt % TiO$_2$) was pumped into the alumina slurry at a flow rate of 5 cc/min. The pH of the resultant mixture was 1.0 and the temperature of the slurry was maintained with stirring at 25° C. for 30 minutes. A 5N NH$_4$OH solution was then added dropwise to maintain a pH rate increase of about 0.05 pH increase/minute until the pH reached 3.5. The slurry was then stirred for an hour.

The resultant slurry was then filtered and the filter cake was washed with 1200 ml of a 1% ammonium bicarbonate solution followed by 300 ml of hot DI water. The resultant solid material was analyzed to have less than 0.04 weight percent sulfate contamination.

The resultant filter cake was reslurried in DI water and spray dried at 100° C. The spray-dried powder was calcined at 700° C. for two hours. The calcined powder was analyzed to have a BET surface area of 170 m$^2$/g. The sulfur uptake (SU) was analyzed in the same manner as described in Example 1-CM and determined to be 0.59 wt. %, and have an NSU of 34.7 μg/m$^2$-sample. These results are reported in Table 1 herein below.

This sample can be directly compared with Samples of Examples 1-CM and 4-C. The analytical results show that the present clad material has a much lower NSU than the unclad material (681 vs. 34.7) and also 1.6 fold lower NSU when compared to the conventionally coated sample of 4-C (55.6 vs. 34.7). In addition the efficiency of the present clad product is about 2.5 fold greater than the coated product (19 vs. 49).

Example 2

A nominal 30% titanic dad alumina was prepared in the same way as Example 1, except that 18.42 g of lanthana doped alumina (MI-386) was used and to which 81.8 g of titanyl sulfate was added. The slurry was washed, spray dried and calcined at 700° C. in the same manner as described in Example 1.

The calcined powder was analyzed to have a BET surface area of 160 m$^2$/g. The sulfur uptake (SU) was analyzed in the same manner as described in Example 1-CM and determined to be 0.55 wt. %, and have an NSU of 34.3 μg/m$^2$-sample. These results are reported in Table 1 herein below.

This sample can be directly compared with Samples of Examples 1 CM and 5-C. The analytical results show that the present dad material has a much lower NSU than the unclad material (68.7 vs. 34.3) and also almost a 1.5 fold lower NSU when compared to the conventionally coated sample of 4-C (50 vs. 34.3), in addition the efficiency of the present dad product is about 2.0 fold greater than the coated product (27 vs. 50).

Example 3

A nominal 10% titanic dad alumina was prepared in the same manner as described in Example 1, except that 23.7 g of alumina (MI-386) was used and to which 27.3 g of titanyl sulfate was added. The slurry was washed, spray dried and calcined at 700° C. in the same manner as described in Example 1.

The calcined powder was analyzed to have a BET surface area of 175 m$^2$/g. The sulfur uptake (SU) was analyzed in the same manner as described in Example 1-CM and determined to be 0.62 wt. %, and have an NSU of 35.4 μg/m$^2$-sample. These results are reported in Table 1 herein below.

This sample can be directly compared with Samples of Examples 1-CM and 2-C. The analytical results show that the present clad material has a much lower NSU than the unclad material (68.7 vs. 35.4) and also almost a 1.5 fold lower NSU when compared to the conventionally coated sample of 4-C (52.5 vs. 35.4).

Example 4

A nominal 10% titania clad alumina was prepared in the same way as Example 3, except that undoped γ-alumina (MI-307 of Grace Davison) was used. The slurry was washed, spray dried and calcined at 700° C. in the same manner as described in Example 1.

The calcined powder was analyzed to have a BET surface area of 167 m$^2$/g. The sulfur uptake (SU) was analyzed in the same manner as described in Example 1-CM and determined to be 0.24 wt. %, and have an NSU of 14.4 μg/m$^2$-sample. These results are reported in Table 1 herein below.

This sample can be directly compared with Samples of Examples 3-CM and 6-C. The analytical results show that the present dad material has a much lower NSU than the unclad material (52 vs. 14.4) and also almost a three fold lower NSU when compared to the conventionally coated sample of 6-C (42 vs. 14.4). In addition the efficiency of the present clad product is about 3.8 fold greater than the coated product (19 vs. 72.3).

Example 5

A nominal 10% titania dad alumina (MI-307) sample was prepared in the same manner as described in Example 4 except that it was calcined at 1000° C. for 2 hours.

The calcined powder was analyzed to have a BET surface area of 66 m$^2$/g. The sulfur uptake (SU) was analyzed in the same manner as described in Example 1-CM and determined to be 0.09 wt. %, and have an NSU of 13.7 μg/m$^2$-sample. These results are reported in Table 1 herein below.

Example 6

A nominal 10% titania clad alumina was prepared in the same way as Example 3, except that undoped δ-alumina (MI-407 of Grace Davison) was used. The slurry was washed, spray dried and calcined at 700° C. in the same manner as described in Example 3.

The calcined powder was analyzed to have a BET surface area of 108 m$^2$/g. The sulfur uptake (SU) was analyzed in the same manner as described in Example 1-CM and determined to be 0.17 wt. %, and have an NSU of 17.6 μg/m$^2$-sample. These results are reported in Table 1 herein below.

Example 7

A nominal 10% titania clad alumina was prepared in the same way as Example 6. The slurry was washed, spray dried and calcined in the same manner as described in Example 3, except that the calcinations was conducted at 1000° C. The calcined powder was analyzed to have a BET surface area of 67 m$^2$/g. The sulfur uptake (SU) was analyzed in the same manner as described in Example 1-CM and determined to be 0.10 wt. %, and have an NSU of 14.9 μg/m$^2$-sample. These results are reported in Table 1 herein below.

Table 1 below shows that all of the titania clad alumina products formed according to the present invention exhibited approximately two fold or greater NSU and efficiencies over the coated samples formed by conventional slurry impregnation.

TABLE 1

| Example No. | Titania (%) | Alumina | Calcination Temp (° C.) | Surface Area (m$^2$/g) | NSU (μg/m$^2$-samp) | Percent Reduction in NSU (%) |
|---|---|---|---|---|---|---|
| Core Material | | | | | | |
| 1-CM. | 0 | MI-386 | — | 182 | 68.7 | |
| 2-CM | 0 | MI-386 | 1000 | 135 | 71.9 | |
| 3-CM | 0 | MI-307 | — | 175 | 52 | |
| 4-CM | 0 | MI-407 | — | 123 | 53.6 | |
| Coated | | | | | | |
| 1-C | 5 | MI-386 | 700 | 184 | 52.7 | 23.2 |
| 2-C | 10 | MI-386 | 700 | 179 | 52.5 | 23.3 |
| 3-C | 10 | MI-386 | 1000 | 129 | 63.6 | 7.5 |
| 4-C | 20 | MI-386 | 700 | 169 | 55.6 | 19.0 |
| 5-C | 30 | MI-386 | 700 | 163 | 50 | 27.2 |
| 6-C | 10 | MI-307 | 700 | 169 | 42 | 19.2 |
| Clad | | | | | | |
| 1 | 20 | MI-386 | 700 | 170 | 34.7 | 49.5 |
| 2 | 30 | MI-386 | 700 | 160 | 34.3 | 50.0 |
| 3 | 10 | MI-386 | 700 | 175 | 35.4 | 48.5 |
| 4 | 10 | MI-307 | 700 | 167 | 14.4 | 72.3 |
| 5 | 10 | MI-307 | 1000 | 66 | 13.7 | 73.6 |
| 6 | 10 | MI-407 | 700 | 108 | 17.6 | 67.2 |
| 7 | 10 | MI-407 | 1000 | 67 | 14.7 | 72.6 |

We claim:
1. A method of forming a titania clad alumina particulate comprising:
   a) mixing an aqueous slurry of from about 1 to about 30 weight percent porous-alumina particulate with an aqueous solution of titanyl sulfate having a pH of from about 0.5 to 1.5 for a period of time to provide a uniform mixture;

b) raising the pH of the mixture at a rate of from 0.05 to 0.5 pH unit/minute to a resultant pH of between 3.4 and 4 by the addition of an aqueous basic solution;

c) allowing the resultant slurry to remain at said resultant pH for a period of from about 10 to 120 minutes;

d) removing sulfate ions from the treated solid particulate to form a material comprising less than 0.5% sulfate;

e) drying the solid particulate followed by heating said solid particulate at from about 400° to 1000° C. for a period of from about 15 to 480 minutes; and f) recovering solid titania clad alumina particulate.

2. The method of claim 1 wherein the initially formed uniform mixture of porous alumina particulate and titanyl sulfate has a concentration of titanyl sulfate in a ratio of titanyl sulfate (calculated as titania) to total oxides of from 1 to 50 and has a pH of from 0.5 to 1.5.

3. The method of claim 1 wherein the pH of the uniform mixture is raised from the initial pH 0.9 to 1.2 to a pH range of from 3.5 to 4 at a rate of 0.05 to 0.25 pH unit per minute under constant agitation followed by maintaining said mixture at said raised-pH for from about 15 to 60 minutes.

4. The method of claim 1 wherein the base of the aqueous basic solution of b) is selected from ammonium hydroxide, ammonium carbonate, ammonium bicarbonate, an alkali metal hydroxide, an alkali metal carbonate, an alkali metal bicarbonate an alkaline earth metal hydroxide, an alkaline earth metal carbonate, an alkaline earth metal bicarbonate, a tri($C_1$-$C_3$)alkyl ammonium compound, a mono-, di- or tri-($C_1$-$C_3$) alkanolamines or mixtures thereof.

5. The method of claim 4 wherein the base is selected from ammonium hydroxide, ammonium carbonate, ammonium bicarbonate or mixtures thereof.

6. The method of claim 1 wherein the sulfate ions are removed from the treated solid particulate of d) by contacting said solid particulate with sufficient amount of water, ammonium hydroxide, ammonium carbonate, ammonium bicarbonate, an alkali metal hydroxide or mixtures thereof.

7. The method of claim 6 wherein the solid particulate is treated with an aqueous solution of ammonium carbonate, ammonium bicarbonate or mixtures thereof.

8. The method of claim 6 or 7 wherein the solid particulate of e) is dried to a powder material and then heated to a temperature of from about 600 to 800° C. for a period of from 1 to 4 hours.

9. A titania clad alumina particulate formed by the process of claim 1, 2, 3, 4, 5, 6, or 7 and having an NSU of less than 45 μg/$m^2$-sample.

10. A titania clad alumina particulate formed by the process of claim 8 having an NSU of less than 45 μg/$m^2$-sample.

11. The product of claim 9 wherein the titania clad alumina particulate has an average particle size of from 1 to 200 μm.

12. The product of claim 10 wherein the titania clad alumina particulate has an average particle size of from 1 to 200 μm.

* * * * *